United States Patent [19]

Fresia

[11] Patent Number: 4,996,783
[45] Date of Patent: Mar. 5, 1991

[54] ACCIDENT PREVENTION DEVICE FOR ROTARY SNOW-PLOW

[75] Inventor: Guilio Fresia, Millesimo, Italy
[73] Assignee: Fresia S.p.A, Italy
[21] Appl. No.: 207,283
[22] Filed: Jun. 15, 1988
[30] Foreign Application Priority Data Jun. 17, 1987 [IT] Italy .................. 12499 A/87

[51] Int. Cl.$^5$ ............................................. E01H 5/09
[52] U.S. Cl. ........................................ 37/245; 56/11.3
[58] Field of Search ................... 37/232, 245, DIG. 5; 192/129 A, 129 B, 133; 266/903; 56/10.3, 10.5, 11.3; 104/172.2, 172.3, 165

[56] References Cited

U.S. PATENT DOCUMENTS

| | | | |
|---|---|---|---|
| 4,062,135 | 12/1977 | Dobberpuhl | 37/245 |
| 4,181,206 | 1/1980 | Seilenbinder | 192/129 A X |
| 4,322,935 | 4/1982 | Poehlman | 56/11.3 |
| 4,402,149 | 9/1983 | Fujii | 37/245 |
| 4,408,683 | 10/1983 | Elmy et al. | 56/11.3 X |
| 4,409,779 | 10/1983 | Bent et al. | 56/11.3 |
| 4,476,643 | 10/1984 | Hilchey et al. | 37/245 |
| 4,696,150 | 9/1987 | Geeck, III | 56/11.3 |

FOREIGN PATENT DOCUMENTS

| | | | |
|---|---|---|---|
| 1964983 | 7/1971 | Fed. Rep. of Germany | 37/245 |
| 2513880 | 10/1975 | Fed. Rep. of Germany | . |
| 3211731 | 10/1983 | Fed. Rep. of Germany | . |
| 3215391 | 10/1983 | Fed. Rep. of Germany | . |
| 431588 | 8/1967 | Switzerland | . |
| 1599418 | 4/1978 | United Kingdom | 192/129 B |
| 1513131 | 6/1978 | United Kingdom | . |

Primary Examiner—Randolph A. Reese
Assistant Examiner—Franco S. DeLiguori
Attorney, Agent, or Firm—Jacobs & Jacobs

[57] ABSTRACT

An accident preventing arrangement for rotary snow-plows includes a front safety bar in front of the rotating blades. When lowered, the safety bar actuates switches which, in turn, not only disengage a clutch for a drive shaft which rotates the blades, but also instantaneously brakes the blades. Another switch located in a driver's cab performs the same functions by manual operator control.

13 Claims, 3 Drawing Sheets

ACCIDENT PREVENTION DEVICE FOR ROTARY SNOW-PLOW

BACKGROUND OF THE INVENTION

It is well known that rotary snowplows are motor-driven vehicles equipped at their front ends with one or more rotary plows. The snowplows progressively plow a snow blanket or snow piles while centrifugal action dumps the plowed snow on both sides of a snow track.

The front part of these plows or blades is unprotected in order to clear snow. This exposure constitutes a genuine hazard for people since accidental contact with exposed rotating blades can cause serious injury, such as dismemberment or crushed limbs.

This risk might be obviated by proper protection devices that are adjustable in height according to snow level. However, such protection devices would not be very efficient.

It should be observed that the blades are very heavy and rotate at a rather high speed during operation. Hence, the blades have an extremely high inertia. Even if an operator were aware of an accidental contact and would shut off the snowplow, the blades would continue to rotate for several seconds, thus causing serious injury.

SUMMARY OF THE INVENTION

This invention is aimed at providing a safety device which protects people who accidentally contact the rotating blades. This invention discloses a primary safety device which includes a front bar that may be seized and pushed downward, to actuate safety control devices having two functions. The first is to cut-out the blade drive by disengaging a clutch mounted on a drive shaft. The second function is to immediately brake the rotating blades. This allows a person near the rotating blades to immediately stop the blades by lowering the front bar.

In addition, a secondary manually controlled safety device is provided inside the driver's cab of the snowplow. This secondary safety device acts in parallel with the primary safety device and functions to disengage the clutch and brake the blades. Thus, the driver, as well as the victim, can stop the blades. The presence of a safety control in the cab enables the driver, who suddenly becomes aware of an obstacle in the snow track, to stop the blades without damaging them.

DETAILED DESCRIPTION OF THE PREFERRED EMBODIMENT

Figure 1:
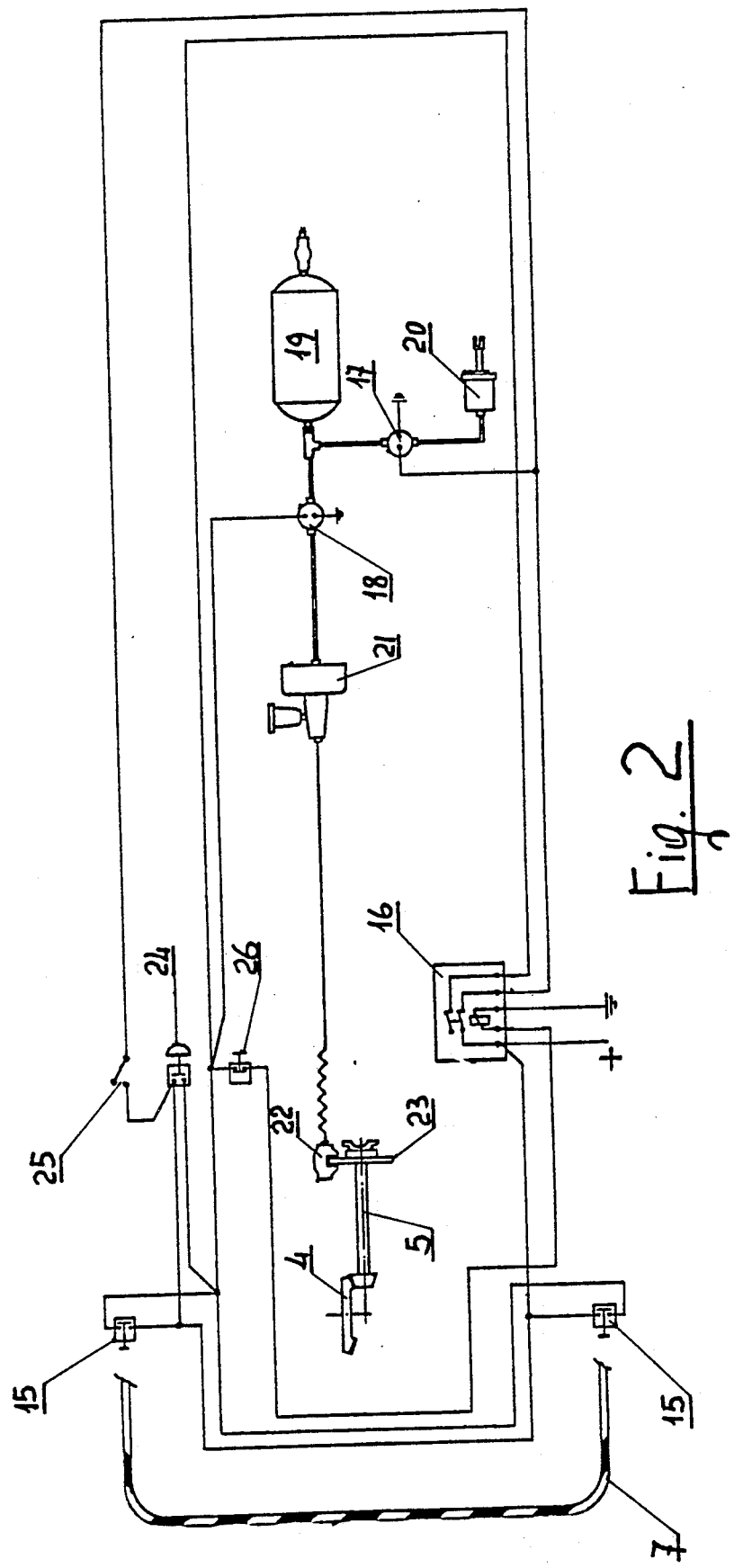
FIG. 1 is a partly schematic side view of a rotary snowplow shown in phantom lines, and equipped with a safety arrangement according to this invention.

With reference to the drawings, numeral 1 identifies one or more plows or blades of a snowplow vehicle 2 whose frame is shown in phantom lines in FIG. 1. The blades 1 are mounted on the front of the vehicle 2 for rotation about a horizontal transverse axle 3. The blades 1 are driven into rotation by a set of bevel gears 4 and a drive shaft 5. The drive shaft 5 is driven by a motor 6 which may either be the main engine of the vehicle 1 or an auxiliary motor, depending upon the type of snowplow.

A channel-shaped safety bar 7 is located in front of and above the blades 1. The bar 7 slopes downward and its free ends are connected to central pivots 8 and to lateral disks 9. The bar 7 is secured in a desired position by shear pins 10 on the bar 7, each shear pin 10 being inserted in a selected one of the numerous holes 11 formed in each disk 9. Thus, the bar 7 is positioned with a suitable downward inclination, according to the height of the snow to be plowed, and can break loose from the disks 9 if an excessive force is applied to the bar 7.

Each lateral disk 9 is rigidly fixed onto one end of a cross member 12 that is hinged to a horizontal transverse pin 13 secured to the frame of the vehicle. Each cross member 12 terminates at its opposite end remote from the disk 9, with a pawl 14 which keeps an electric switch 15 in an open state during normal operating conditions (see FIG. 3).

Figure 3:
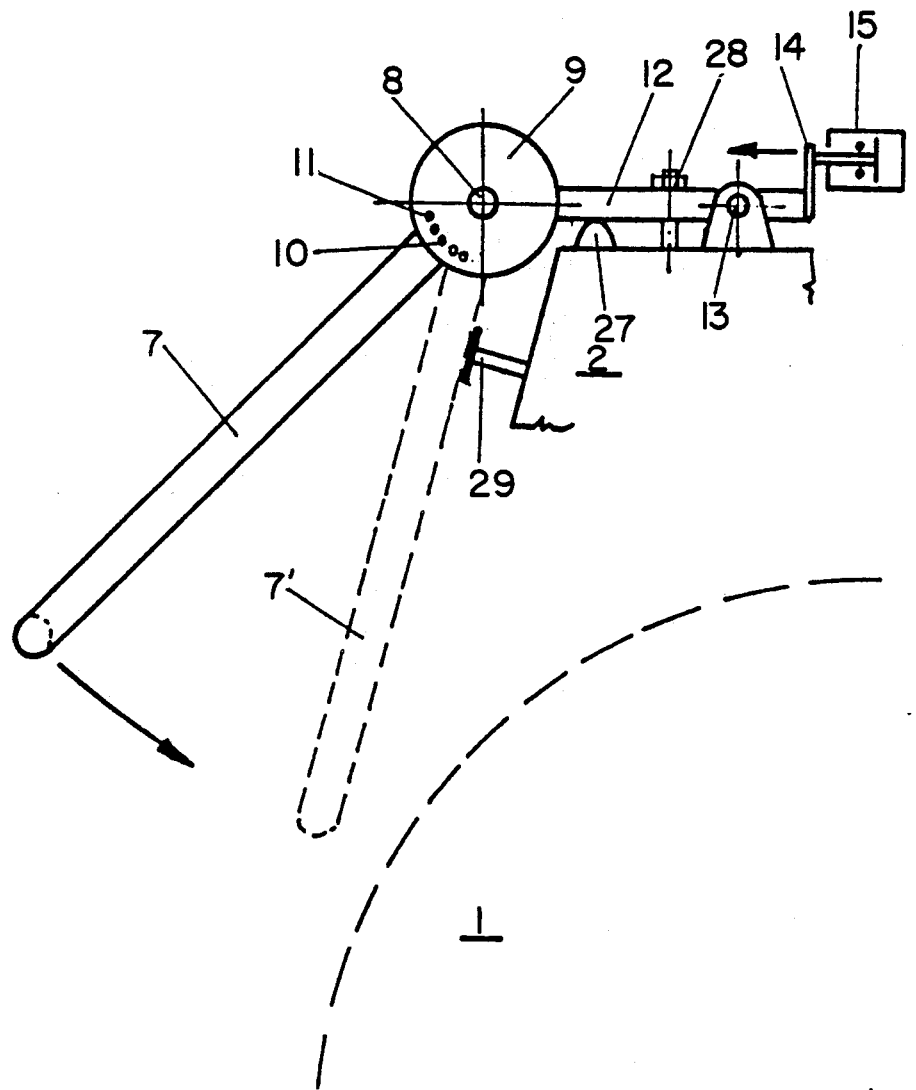
FIG. 3 is an enlarged side view of the safety bar and part of the safety arrangement.

It is clear that, when the bar 7 is lowered toward the dashed line position identified by the bar 7' in FIG. 3, the cross members 12 are pivoted downwardly about pins 13, and the electric contacts of the switches 15 will be actuated to a closed state.

Figure 2:
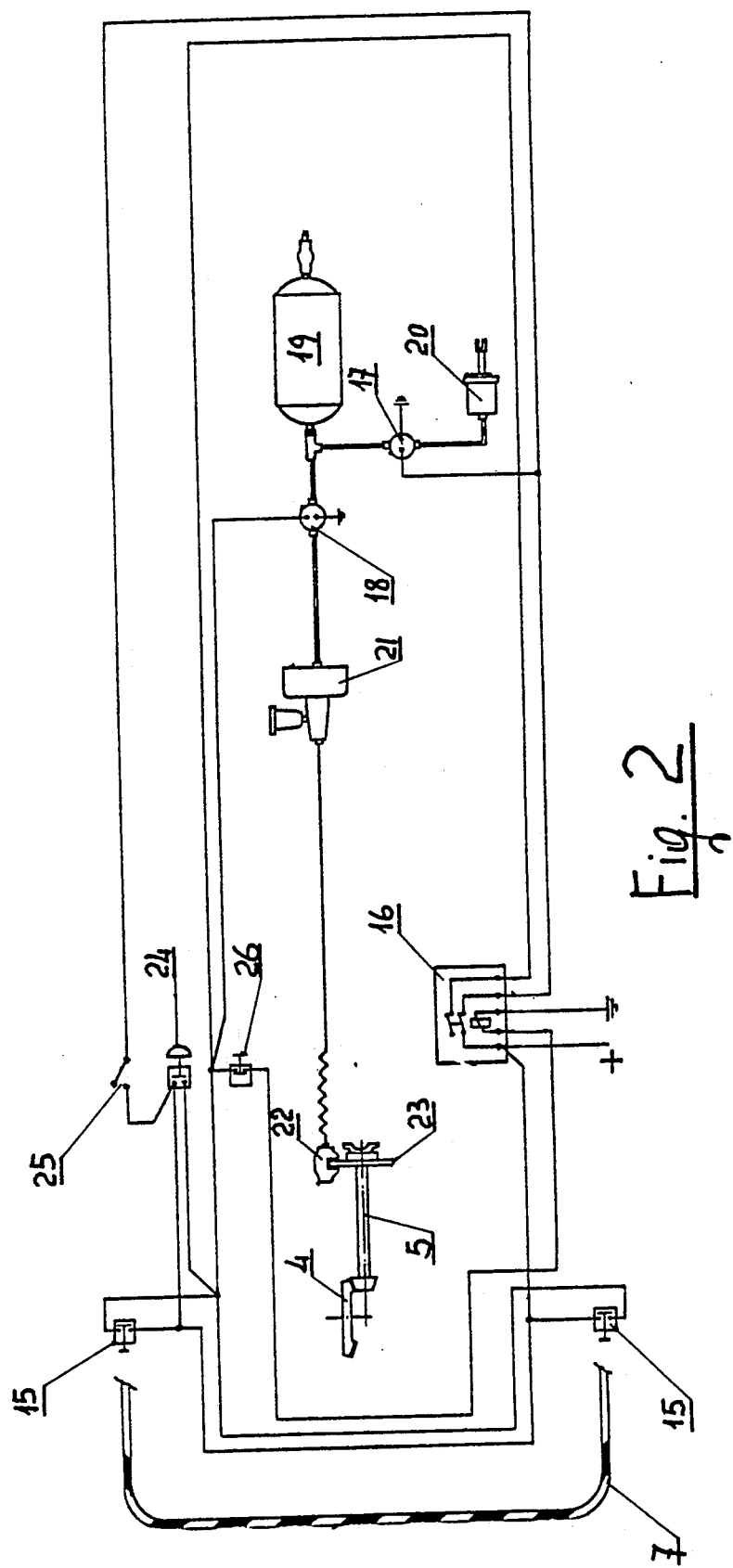
FIG. 2 is a top view showing a partly broken-away safety bar mounted at the front of the snowplow, and also showing an electrical circuit diagram of the safety arrangement.

As shown in FIG. 2, the switches 15 are electrically connected in parallel in an electrical circuit. Each closed switch 15 separately energizes, by means of a common excitation relay 16, two solenoid valves 17 and 18 located in a pneumatic circuit branched off from a service tank 19. The solenoid 17 is located on the supply line of a pneumatic control cylinder 20 of the clutch (not illustrated) for the drive shaft 5. The solenoid 18 is mounted on the supply line of a pneumatic-hydraulic converter 21 actuating a caliper 22 of a disk brake 23 mounted on the same drive shaft 5.

It follows that either or both switches 15, when closed, can disengage the clutch of the drive shaft 5 for the blades 1, and can actuate the brakes 22, 23, thus instantaneously stopping the blades 1 by a sudden braking action.

An additional manually-controlled switch 24 is located in the driver's cab (see FIG. 1) and is electrically connected in parallel with the above-mentioned switches 15. By closing the switch 24, a driver can disengage the clutch and brake the blades.

Furthermore, a hand-operated switch 25 controls the motion of the blades 1 and acts only on the solenoid valve 17 to engage or disengage the clutch of the drive shaft 5. Working conditions are reset by a pushbutton 26, which can be opened manually, thus de-energizing the solenoid valves 17 and 18 after the blades 1 have been safety-locked.

To keep the bar 7 properly positioned, as shown in its solid-line position in FIG. 3, an elastic mechanism 27, acting as a rubber bumper, engages each cross member 12. A bolt 28 also engages each cross member and prevents accidental lifting of the bar 7 to an elevation which might damage the switches 15. A stop 29 will prevent the bar 7 from falling on the blades 1 upon failure of the shear pins 10, as illustrated by bar position 7' in FIG. 3.

As already explained, the switches 15 and 24 are actuated by being closed. The switches 15 and 24 can also be actuated by being opened, in which case, these switches will be electrically connected in series in the electrical circuit of FIG. 2, so that opening of switches 15 and 24 will brake the blades 1.

The above-mentioned electric control circuit can, of course, be replaced by pneumatic or hydrodynamic controls, for actuating, either directly or through valves, the clutch cylinder-piston unit 20 and the pneumatic-hydraulic brake converter 21.

I claim:

1. In a snow-plow having rotary blade means mounted forwardly on the snow-plow, as considered along a longitudinal direction of advancement, and rotatable about a transverse axis perpendicular to said longitudinal direction by a blade drive, to clear snow ahead of the snow-plow, an improved safety arrangement, wherein the improvement comprises:
   (a) a safety bar having a forward transversely-extending rod portion located forwardly of the blade means, and a pair of longitudinally-extending arm portions, said safety bar being movable from an unactuated position in which the safety bar is positioned at a predetermined distance forwardly of the blade means, to an actuated position in which the safety bar is positioned at a distance less than said predetermined distance to the blade means upon collision with an obstacle located forwardly of the blade means; and
   (b) safety means responsive to movement of the bar to the actuated position, for disengaging the blade means from the blade drive to prevent rotation of the blade means, and for simultaneously braking and preventing further rotation of the blade means due to inertia, including
      (i) a pair of electrical switches, each actuatable between unactuated and actuated states, and operatively coupled to a respective arm portion to actuate a respective switch to the actuated state when the safety bar is in the actuate position, and
      (ii) a pair of longitudinally-extending cross members at opposite sides of the snow-plow, each cross member having opposite ends and being pivotable mounted on the snow-plow at an intermediate portion between the ends thereof, one of the ends of each cross member being operatively connected to a respective switch, the other of the ends of each cross member being operatively connected to a respective arm portion, each cross member being pivoted by the safety bar as the safety bar moves between said unactuated and actuated positions.

2. The safety arrangement according to claim 1, wherein the safety means includes means for elastically supporting each cross member, and for constantly urging each cross member to a rest position.

3. The safety arrangement according to claim 1, wherein the safety means includes means for preventing the pivoting movement of each cross member past an end-limiting position.

4. The safety arrangement according to claim 3, wherein the safety means includes a pair of apertured disks fixedly mounted on said opposite ends of the cross members, each disk having a plurality of angularly spaced-apart holes; and wherein each arm portion has a shear pin insertable into a selected one of the holes.

5. The safety arrangement according to claim 4, wherein the preventing means includes a stop means for abutting the safety bar and maintaining the same out of contact with the blade means in the event of shearing of the shear pin.

6. The safety arrangement according to claim 1, wherein the safety means includes a source of hydraulic fluid, a hydraulically-operated brake coupled to the blade means, and an electrically-operated first control unit electrically connected to each said electrical switch and operative for controlling fluid flow from the source to the brake to prevent rotation of the blade means.

7. The safety arrangement according to claim 6, wherein the safety means includes a hydraulically-operated clutch control device, and an electrically-operated second control unit electrically connected to each said electrical switch and operative for controlling fluid flow from the source to the clutch control device, to disengage the blade means from the blade drive.

8. The safety arrangement according to claim 7, wherein each electrical switch, when actuated, simultaneously operates the clutch control device and the brake.

9. The safety arrangement according to claim 8, wherein said electrical switches are electrically connected in parallel, each switch being independently operative for simultaneously operating the clutch control device and the brake.

10. The safety arrangement according to claim 7; and further comprising reset means on the snowplow, for re-engaging the blade means with the blade drive, and for releasing the blade means for further rotation.

11. The safety arrangement according to claim 10, wherein the reset means includes a manually-operated reset switch for simultaneously operating the clutch control device to re-engage the blade means with the blade drive, and to release the brake.

12. The safety arrangement according to claim 1, wherein the safety means further includes an auxiliary electrical switch mounted in a cab for an operator of the snowplow, and wherein the auxiliary switch is manually actuatable by the operator between an unactuated state in which the blade means is rotatable by the blade drive, and an actuated state in which the blade means is disengaged from the blade drive and is braked.

13. The safety arrangement according to claim 12, wherein the safety means still further includes a clutch-only disengage switch mounted in the cab for manual operation by the operator, said clutch-only disengage switch being operative solely for disengaging the blade means from the blade drive.

* * * * *